UNITED STATES PATENT OFFICE.

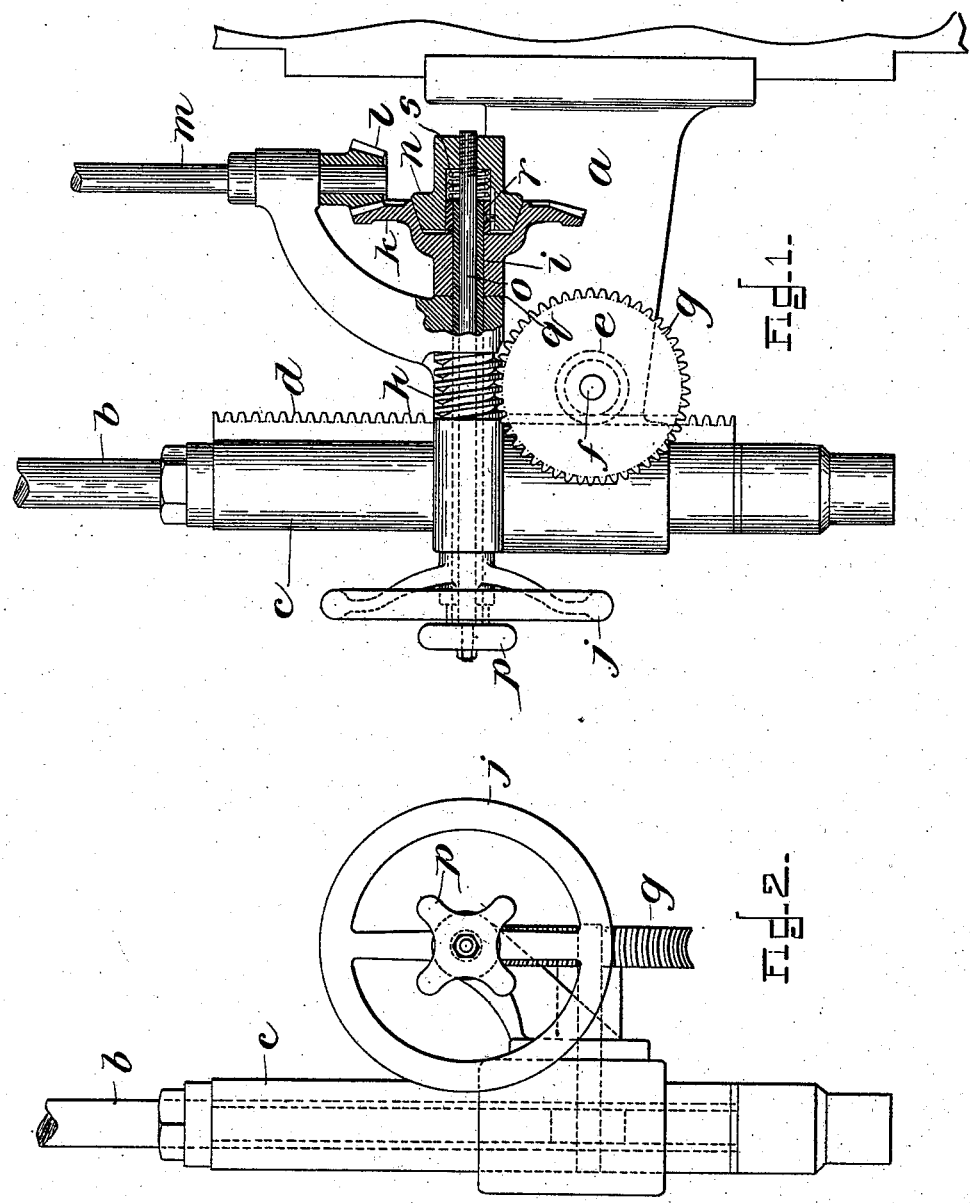

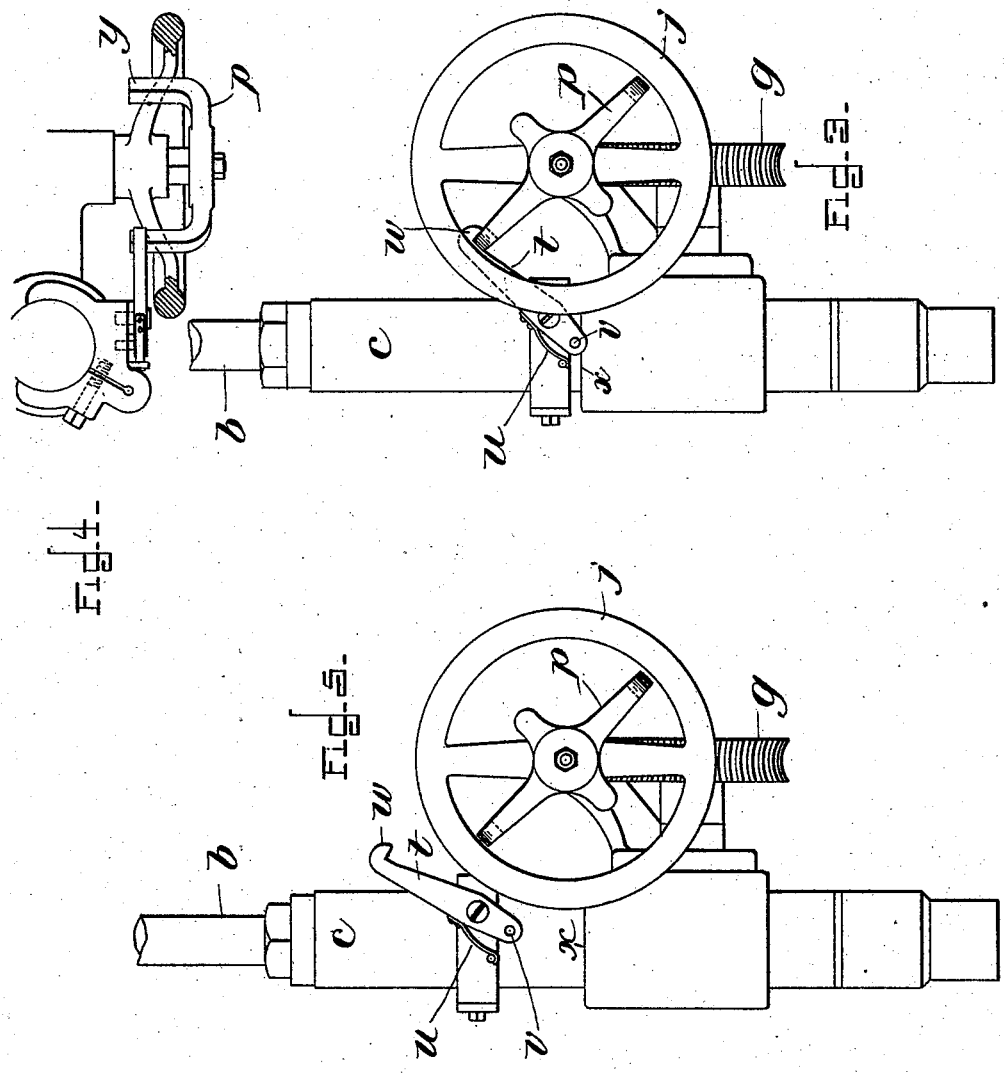

ALBERT H. MORTON, OF LOWELL, MASSACHUSETTS.

AUTOMATIC FEED-STOPPING MECHANISM FOR DRILLING-MACHINES.

SPECIFICATION forming part of Letters Patent No. 577,110, dated February 16, 1897.

Application filed August 22, 1896. Serial No. 603,611. (No model.)

*To all whom it may concern:*

Be it known that I, ALBERT H. MORTON, of Lowell, in the county of Middlesex and State of Massachusetts, have invented certain new and useful Improvements in Automatic Feed-Stopping Mechanism for Drilling-Machines, of which the following is a description sufficiently full, clear, and exact to enable those skilled in the art to which it appertains or with which it is most nearly connected to make and use the same.

This invention has relation to devices for automatically stopping the feed of drills in drilling-machines at a predetermined point in their operation.

It is the object of the invention to provide such improvements in devices of the kind mentioned as will at once simplify and cheapen the cost of their construction, render them easy and ready of application to drills as commonly constructed, and make them certain in their operation.

To these ends the invention consists in combining with a dog or pawl pivoted upon the feeding-sleeve or other feeding means in such manner that its pivotal point may be adjusted vertically thereon a device secured upon the clutch shaft or rod and constructed so as that the pawl or dog in its descent may engage it and hold the said rod or shaft against turning with the rotary sleeve, through which it passes, (provided with the feed-operating means,) and so release or unclutch the feed shaft or sleeve, a suitable stop being arranged on the stationary part of the drilling-machine to engage the dog or a part or feature projecting therefrom and operate it so as to bring it into line with the said device on the clutch-rod to hold the latter against rotation with the feed-sleeve, all as I will now proceed to describe in detail, and then point out with particularity in the claims.

Reference is to be had to the annexed drawings, and to the letters marked thereon, forming a part of this specification, the same letters designating the same parts or features, as the case may be, wherever they occur.

Of the drawings, Figure is a side view, partially in section, of so much of a drilling-machine as it is necessary to show in order to explain my invention. Fig. 2 is a front view of what is portrayed in Fig. 1. Fig. 3 is a view similar to Fig. 2, and representing in addition my improvements as applied to a drilling-machine and in the act of stopping the feed of the drill. Fig. 4 is a top view, partially in section, of what is represented in Fig. 3. Fig. 5 is a view similar to what is shown in Fig. 4, but showing the automatic feed-stopping means as they will appear during the descent of the drill and before the engagement of the dog with the device on the clutch rod or shaft.

In the drawings, $a$ designates the supporting bracket or frame. $b$ is the drill-spindle. $c$ is the feed-sleeve, provided with a rack $d$, which is engaged by a pinion $e$, (shown in dotted lines,) fast on a shaft $f$, provided with a worm-gear $g$, which engages and is driven by a worm $h$ on a hollow shaft or sleeve $i$, provided at one end with a hand-wheel $j$ and at the opposite end with a bevel-wheel $k$, the latter being engaged by a bevel-pinion $l$ on a shaft $m$, which may be driven by any suitable means.

The parts and features of the machine thus far mentioned may be of the form and construction shown or any other suited to the purpose, they not having been wrought upon or changed in the production of my invention.

The bevel-gear $k$ runs loose upon the hollow shaft $i$ and is formed as a clutch part to coöperate with a clutch part $n$, secured upon one end of the rod $o$, the latter extending through the hollow shaft $i$ and provided, if need be, on its opposite end with a hand device $p$, as usual. The bevel-gear $k$ is held in a place longitudinally on the shaft $i$ by abutting at one side against a stationary part, as at $q$, and by a collar $r$, keyed upon the shaft $i$ at the opposite side. The clutch part $n$ is splined upon the shaft $i$ so as to move longitudinally thereon but to be turned therewith, and the said clutch part $n$ is furthermore chambered in its hub, as shown in Fig. 1, in which chamber around the rod $o$ there is arranged a helical spring $s$, which bears at one end against the said clutch part and at the other end against the collar, so as to tend to keep the clutch parts $k$ and $n$ separated.

The rearward end of the rod $o$ is screw-threaded and tapped into the clutch part $n$, so that by the turning of the said rod the parts $k$ and $n$ may be clutched or unclutched, as may be desired.

$t$ designates a pawl or dog pivoted upon a pinch-collar or clamp adapted to be secured at any desired point up or down upon the feed-sleeve $c$. A spring $u$ is employed in connection with the said dog and its support, as shown, or in any other suitable way, to hold the dog normally raised, as shown in Fig. 5.

$v$ is a pin which projects laterally from the heel or end of the dog opposite its hooked end $w$, which pin, as the sleeve $c$ descends, is adapted to come into contact with the upper face $x$ of the supporting-bracket or other stationary part, with the effect of moving the said dog so as to cause its hooked end to engage an arm or projection $y$ of the device $p$, or an equivalent thereof, secured to the rod $o$, holding the latter against turning and effecting the unclutching of the parts $k$ and $n$ by the continued turning or partial turning of the part $n$ by the part $k$ after the rotation of the rod $o$ has been stopped, and so stopping the feed of the drill, it being understood that it is necessary only to separate the clutch parts to a very slight extent to avoid the operation or movement of the part $n$ by the part $k$. It is to be further understood that when the rod $o$ is held from turning with the feed-sleeve and the clutch part $n$ is still turned by frictional engagement with the part $k$ the said part $n$ will, as it were, be unscrewed on the threaded end of the rod $o$ and moved back from contact with the part $k$.

The extent of the feed of the drill, as is obvious, is determined by its position on the feed-sleeve.

The device $p$ may be provided with as many arms or projections $y$ as may be desired, and said device may also be given any desired form or shape so long as it subserves its described purpose.

It will be observed that when the feeding sleeve or means is arranged in horizontal or other position than vertical the mode of operation will be the same as that hereinbefore described. Hence my invention is not limited to the precise position or arrangement of parts shown.

It will be further seen that, as stated at the outset of this specification, my invention is exceedingly simple in construction, is readily and easily applied, and is certain in its operation. Again, if it should not be needed in the use of the machine it can be quickly and easily displaced or removed.

Having thus explained the nature of the invention and described a way of constructing and using the same, though without attempting to set forth all of the forms in which it may be made or all of the modes of its use, it is declared that what is claimed is—

1. An automatic feed-stop for drilling-machines comprising in its construction a pivoted dog on the feed-sleeve, a device on the clutch-shaft adapted to be engaged by the dog and to be thereby held against turning, and a stop to engage the dog and actuate it to engage the said device.

2. An automatic feed-stop for drilling-machines comprising in its construction a pivoted dog, a support upon which the dog is pivoted, adjustable on the feed-sleeve, a device on the clutch-shaft adapted to be engaged by the dog and to be thereby held against turning, and a stop to engage the dog and actuate it to engage the said device.

3. The combination, with the feed-sleeve, the collar or clamp adjustable thereon and the dog pivoted upon the said collar, of the clutch-rod and its clutch part, a device on the said rod adapted to be engaged by the dog, and a stop to engage the dog to move it into engagement with the said device.

In testimony whereof I have signed my name to this specification, in the presence of two subscribing witnesses, this 30th day of July, A. D. 1896.

ALBERT H. MORTON.

Witnesses:
 ARTHUR W. CROSSLEY,
 ARTHUR F. RANDALL.